Figure 1:
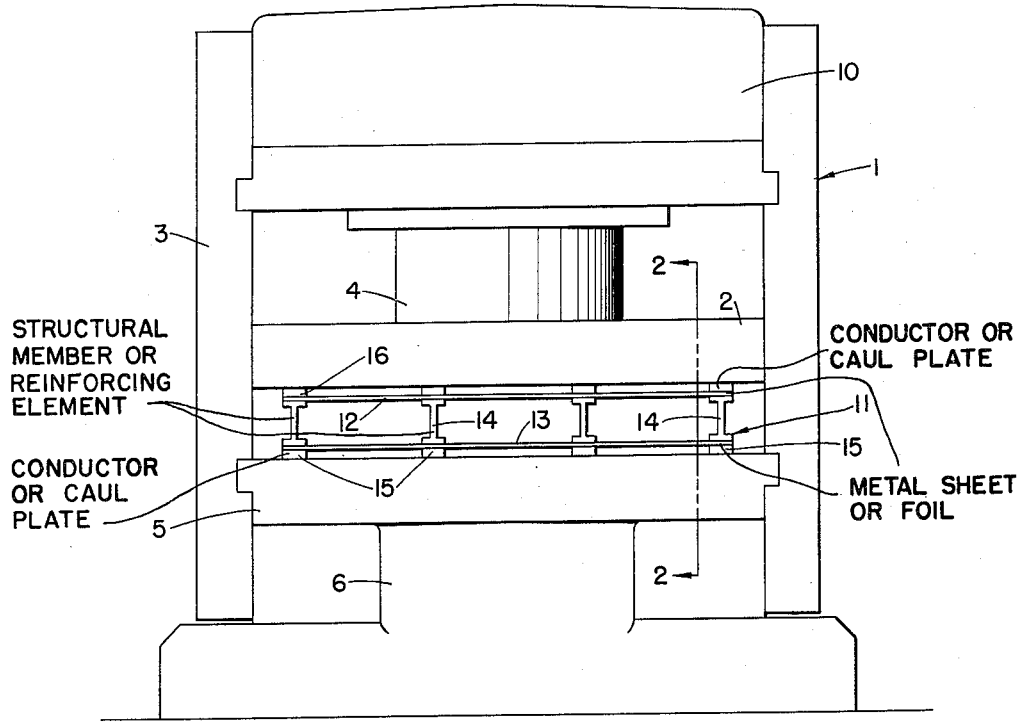

March 20, 1951     B. D. RAFFEL     2,545,704

METHOD OF FABRICATING METAL LAMINATES

Filed April 29, 1947

INVENTOR

BERNARD D. RAFFEL

BY

ATTORNEY

Patented Mar. 20, 1951

2,545,704

UNITED STATES PATENT OFFICE 2,545,704

METHOD OF FABRICATING METAL LAMINATES

Bernard D. Raffel, Akron, Ohio, assignor to Wingfoot Corporation, Akron, Ohio, a corporation of Delaware Application April 29, 1947, Serial No. 744,735

3 Claims. (Cl. 154—118)

1

The present invention is concerned with a process for facilitating the fabrication of metal laminates with the use of thermosetting adhesives. More particularly, the invention relates to a method of manufacturing metal laminates embodying an assembly of spaced metal laminae and intermediate spaced stiffener or structural members to the contacting surfaces of which a thermosetting adhesive has been app'ied by the application of heat and pressure to the assembly so as to prevent the occurrence of defects such as wrinkling, buckling, and the like in the exposed laminae of the assembly.

It is an object of the present invention to provide a method of preventing the occurrence of wrinkling, buckling, and other similar defects in certain of the laminae comprising the parts of metal laminates which are to be bonded together by the use of thermosetting adhesives.

It is a further object of the present invention to achieve the desired advantageous result with a minimum of additional effort and apparatus and at a low cost.

Modern structural designs have more recently turned for many purposes to the application of various metal laminates such as were used to great advantage in the manufacture of aircraft surfaces and the like in which the laminae in the form of metal sheets or foils were assembled together with ribs or stiffener members of various structural sections inserted therebetween and secured together by the use of thermosetting adhesives. In the course of manufacture of such assemblies, the structure is subjected to heat and pressure in a conventional platen press. It has been found that as a result of this method of manufacture certain defects such as wrinkling, buckling, and the like frequently occur in the sheets or foils because of the expansion differentials between the pressure-applying device and the metal sheets of the laminate as the rise in temperature takes p'ace.

The exposed laminae of such metal laminates in the form of sheets or foils are necessarily firmly held against shifting and as a result no compensation for the expansive force created by the change in temperature therein is permitted. The expansive force induced in the exposed foil surfaces, therefore, translates itself into the above-described defects. Such wrink'ed or buckled surfaces are highly objectionable both from a functional and an appearance standpoint, particularly where such surfaces are employed in the construction of aircraft and the like.

As indicated in the foregoing discussion of the problem which the present invention seeks to solve, the expansion of the outermost laminae of the metal laminate cannot take place freely when the elements are firmly held in place without some provision being made for the alleviation of

2 such expansive forces. Numerous efforts have been made to avoid the translation of such expansive force as is developed in the exposed laminae into wrinkling and buckling of the surfaces. One such procedure involves the preheating of the press platen in which the laminates are to be bonded. This procedure, however, results in an expansion of the laminae but not of the platen, and when the thin sheets or foils expand, they tend to buckle into the more resilient adhesive, creating serious defects among which is an imperfect bond between the surfaces.

According to the applicant's inventive concept, a suitable medium such, for example, as conductors or auxiliary pieces of sheet material having the same or substantially the same properties as the exposed laminae of the assembly which is to be constructed, are laid over the exposed surfaces of the laminae in positions corresponding as nearly as possible to, and of the area of, the adhesive applied internally of the assembly so that the heat and pressure will be applied thereto. Under this procedure, the expansive force generated in the auxiliary medium causes a direct, simultaneous linear expansion of both the medium and the lamina with which it is in contact in a plane generally parallel to the plane of the assembled laminate. Slippage actually occurs between the medium and the press platen, thus permitting the exposed lamina of the assembly to expand along with the medium and virtually eliminates all buckling and wrinkling effects therein.

In furtherance of the foregoing objects, the process of the present invention embodies the step of applying heat and pressure locally to the area of the exposed laminae and corresponding generally to that covered by the adhesive in fabricating the assembly. To prevent the wrinkles and other defects from forming in the exposed laminae, the heat and pressure is transmitted to the adhesive through a medium having a coefficient of expansion in that range from equal to to greater than that of the exposed laminae. This medium advantageously takes the form of a piece of material which is placed over the above specified area of the exposed lamina and may be a piece of the same material as that employed in the fabrication of the metal lamina with which it is in contact.

By way of illustration of the teachings of the present invention, attention is directed to the accompanying drawings disclosing one form of apparatus capable of carrying out applicant's novel process. Fig. 1 is an elevation of a platen press with the assembled metal laminates disposed between the platens thereof and having a plurality of media or conductors positioned on the external faces of the assembled laminate adjacent the positions of the adhesive therein. Fig.

2 is a partial cross-section taken along the line 2—2 in Fig. 1.

In Fig. 1 of the drawing, the reference numeral 1 identifies generally a conventional platen press for exerting heat and pressure on the assembly of laminae which are to be bonded together as by means of a thermosetting adhesive. The platen press 1 embodies a movable platen 2 slidably supported in the frame 3 and actuated by a pressure cylinder 4. The movable platen 2 cooperates with a stationary platen 5 supported on the base 6 to exert pressure upon a work piece disposed upon the stationary platen when the cylinder 4 is operated.

Figure 2:
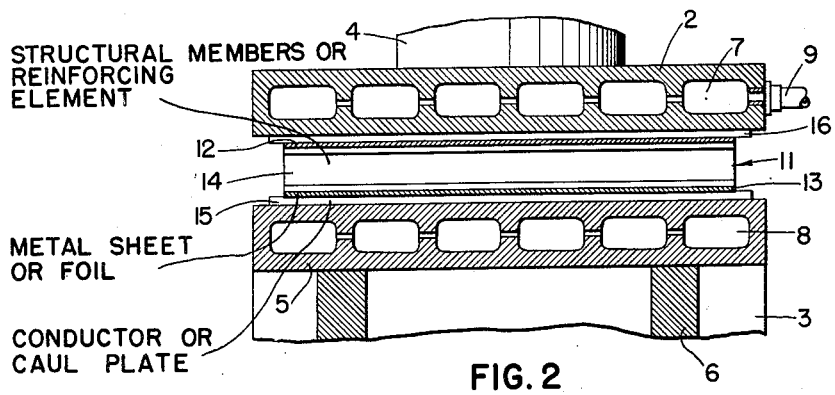

The platens 2 and 5 are advantageously provided with a series of internally formed chambers 7 and 8, respectively (see Fig. 2), through which hot water, steam, or some other similar heating medium is circulated to produce the desired heating effect upon the work piece being fabricated. A suitable form of conduit 9 or other connection is employed in directing the heating medium to the chambers 7 and a similar connection (not shown) supplies the chambers 8. A suitable pressure-inducing medium is introduced to the head 10 for the actuation of the cylinder 4 and the movable platen 2.

The work piece in the present instance is a metal laminate identified generally by the reference numeral 11. The metal laminate 11 embodies the metal sheets or foils 12 and 13 (sometimes referred to as "skins") which represent the exposed laminae of the work. The foils 12 and 13 are assembled together with a plurality of structural members or ribs 14 disposed therebetween and arranged in spaced, mutually parallel relation.

A suitable bonding agent in the form of a thermosetting adhesive is applied to the contiguous surfaces of the structural members 14 and the foils 12 and 13 when the parts are assembled. It will be readily understood that many other suitable forms of metal laminates may be fabricated with the employment of the same procedure as that herein described. The assembly shown, however, is most advantageous in demonstrating applicant's inventive concept for the reason that it has a more distinct tendency, if not properly handled, to develop wrinkling and buckling in the exposed laminae or foils 12 and 13 by reason of the relatively long unsupported portions thereof extending between the spaced members 14.

The metal laminate 11, after having been assembled and subjected to the application of the adhesive in the manner illustrated, is placed on the stationary platen 5 with a plurality of conducting media in the form of metal pieces or strips 15 disposed between the outermost face of the exposed lamina or foil 13 and the face of the platen. The strips 15 are advantageously of a size and shape corresponding generally to the dimensions of that area of the foil 13 covered by the adhesive and are preferably located at points coincident with the position of the members 14 in the assembly of the laminate 11.

Conductors or strips 16 similar to the strips 15 are disposed in like fashion on the outermost face of the exposed lamina or foil 12 of the laminate 11. As in the case of the strips 15, the strips 16 are of a size and shape corresponding generally with the dimensions of that area of the adhesive bond between the foil 12 and the members 14. The strips 16 are placed on the outermost face of the foil 12 at positions substantially coincident with the points of contact between the foil and the members 14 to serve as a medium of contact between the face of the movable platen 2 and the foil 12.

The conductors or strips 15 and 16 are advantageously formed from material which possesses properties closely simulating those of the material of which the foils 12 and 13 are made. By reason of the fact that the heat of the platens 2 and 5 must be uniformly transmitted to the adhesive through the medium of the strips 15 and 16, the strips should, in any event, be made from a material which has a coefficient of expansion at least equal to or greater than that of the several laminae of the laminate to achieve best results.

The best results have been obtained when the strips 15 and 16 were made from the same material as that from which the foils 12 and 13 were made. It is highly desirable that the strips be formed of material of about one-eighth inch gauge or thickness to achieve the most satisfactory operation of applicant's teaching. The material may, however, vary in thickness from one-thirty second to one-half inch without materially affecting the nature of the results obtained.

The effectiveness of the process resides in the ability of the strips 15 and 16 to expand from the heat of the platens 2 and 5 and stretch at a rate sufficient to place the foils 12 and 13 under constant tension during the time required to set the adhesive. In this way, since the foils are tensioned uniformly, any attempt on the part of said foils to wrinkle or buckle between the spaced ribs 14 or directly over the ribs and into the incompletely set adhesive is thwarted.

Numerous modifications may be made in the teachings of the present invention. The strips 15 and 16 may take the form of plates of varying shapes and dimensions. The process may be applied to any of a variety of forms of metal laminates involving one or more overlapping foils and various types of intermediate members even including additional foils and the like. Other similar changes may be made without in any way affecting the scope or spirit of the present invention.

As previously stated, the material from which the strips or plates 15 and 16 are made may be of any suitable gauge within certain predetermined ranges. It should be noted, however, that the strips which expand and serve to stretch the thin foils of the metal laminate need only be of such thickness or gauge that under heat, they will expand and slide against the platens rather than buckle. Obviously, if the strips are so light that they tend to buckle under heat themselves, the intent and purpose of the inventive concept will be defeated.

While in accordance with the patent statutes one best known embodiment of the invention has been illustrated and described in detail, it is to be particularly understood that the invention is not limited thereto or thereby, but that the inventive scope is defined in the appended claims.

I claim:

1. A method of fabricating metal laminates in which the exposed laminae are characterized by smooth surfaces free from such defects as wrinkles and buckles, said method comprising the steps of assembling the laminate which embodies arranging a plurality of reinforcing elements, superposing thereon at least one thin metal sheet, and interposing a thermosetting adhesive between said reinforcing elements and said metal sheet; placing on the metal sheet in positions corresponding generally to the disposition of the reinforcing elements, metal conductors having a coefficient of expansion in a range from equal to to greater than that of the metal sheet with which they are in contact; applying heat and pressure to the laminate through the metal conductors; and maintaining the heat and pressure until the adhesive is set.

2. A method of fabricating metal laminates in which the exposed laminae are characterized by smooth surfaces free from such defects as wrinkles and buckles, said method comprising the steps of assembling the laminate which embodies a pair of thin metal sheets spaced apart by a plurality of reinforcing elements disposed therebetween, said metal sheets and said reinforcing elements having interposed therebetween a thermosetting adhesive; placing in contact with the exposed metal sheets in positions corresponding generally to the disposition of the reinforcing elements therebetween metal conductors ranging in gauge from one-eighth to one-half inch and having a coefficient of expansion at least equal to but not less than that of the metal sheets; applying heat and pressure to the laminate through the several metal conductors between which it is disposed; and maintaining the heat and pressure until the adhesive is set.

3. A method of fabricating metal laminates in which the exposed laminae are characterized by smooth surfaces free from such defects as wrinkles and buckles, said method comprising the steps of assembling the laminate which embodies applying a thermosetting adhesive to localized areas of one surface of a first metal lamina, positioning thereon a plurality of structural members each in contact with an adhesive area, applying the thermosetting adhesive to localized areas on one surface of a second metal lamina corresponding generally with the locations of the several structural members when the parts are assembled, and superposing the second metal lamina on the structural members with the adhesive areas in contact therewith in such fashion that the structural members will be disposed between the two metal laminae; disposing on the exposed surfaces of the metal laminae in positions approximating the locations of the structural members, metal strips of a size corresponding generally to that of the adhesive areas, said strips being approximately one-eighth inch in gauge and having a coefficient of expansion greater than that of the metal laminae with which they are in contact; applying heat and pressure to the laminate through the several strips between which it is disposed; and maintaining the heat and pressure until the adhesive is set.

BERNARD D. RAFFEL.

REFERENCES CITED

The following references are of record in the file of this patent:

UNITED STATES PATENTS

| Number | Name | Date |
|---|---|---|
| 1,377,513 | Novotny | May 10, 1921 |
| 1,832,531 | Close | Nov. 17, 1931 |
| 2,205,466 | Caprio et al. | June 25, 1940 |
| 2,276,035 | Guhl | Mar. 10, 1942 |
| 2,293,914 | Nanfeldt | Aug. 25, 1942 |
| 2,404,165 | Carver | July 16, 1946 |
| 2,448,357 | Craig | Aug. 31, 1948 |

OTHER REFERENCES

Transactions of the A. S. M. E., vol. 60, 1938, pp. 61 and 63, and 684.